United States Patent Office 2,897,246
Patented July 28, 1959

2,897,246

ALKYLATION PROCESS WITH TREATED SILICA-ALUMINA CATALYST

Adrianus de Keizer, Amsterdam, Netherlands, and John Norton Wilson, Berkeley, Calif., assignors to Shell Development Company, New York, N.Y., a corporation of Delaware No Drawing. Application December 28, 1955
Serial No. 555,742

Claims priority, application Netherlands
December 28, 1954

4 Claims. (Cl. 260—671)

This invention relates to a process for the production of poly-isopropyl benzenes.

It is a principal object of the present invention to provide a commercially useful process for preparing diisopropyl benzenes, particularly with high yield of para-diisopropyl benzene. Other objects of the invention will appear from the description thereof.

Briefly, the present invention is concerned with the production of diisopropyl benzenes by the alkylation of cumene with propylene. This operation is substantially improved, in accordance with the present invention, by carrying out the reaction in the presence of an acidic siliceous cracking catalyst which has been subjected, after preparation, to heating in the presence of water vapor, preferably for from 1 to 24 hours, at a temperature between 400° and 900° C.

It has been proposed in copending applications of one of the present inventors to effect corresponding alkylations in liquid phase in the presence of solid acidic siliceous catalysts. However, in the liquid phase alkylation of benzene or cumene with propylene a rapid decline in the conversion occurs when employing the usual alumina-silica catalyst, containing from 10% to 30% $Al_2O_3$ and from 70% to 90% $SiO_2$.

It has now been found that this drawback can be overcome to a great degree by subjecting the catalyst before use to contact with water vapor, preferably for from 1 to 24 hours, at a temperature between 400° and 900° C. Sometimes the steam treatment may cause the initial activity of the catalyst to be lower than that of the untreated catalyst, but the decline in activity upon use is so much slower that even in those cases a substantial advantage is obtained.

In the process according to the present invention, catalysts of the aluminum silicate type are especially preferred, being cracking catalysts mainly consisting of $Al_2O_3$ and $SiO_2$, while a number of other components such as $Na_2O$, $K_2O$, CaO, MgO, $ZrO_2$, $H_2O$, $CO_2$ and $SO_3$ may also occur in smaller quantities, sometimes traces. These catalysts usually have higher $SiO_2$ than $Al_2O_3$ content. A ratio by weight which frequently occurs is, for example, 70–90% by weight of $SiO_2$ and 30–10% by weight $Al_2O_3$. Further, the catalysts employed have a water content of less than 3.5% by weight.

Catalysts for use in accordance with the processes of the above referred to copending patent applications were prepared substantially as follows:

Waterglass was converted into a silica gel by the addition of sulfuric acid. To this were added aqueous solutions of aluminum sulfate and ammonia, with the result that an alumina gel precipitated "on the outside" of the $SiO_2$ particles. The precipitate obtained was filtered in vacuo and afterwards thoroughly washed in three stages. After suspending in water, the suspension obtained was fed at a pressure of 150 atmospheres gauge to a spray drier in which the gas temperature during feeding was 850° C. The catalyst powder formed in the spray drier was caught in three cyclones positioned in series. In order to remain above the dew point of steam the course of the temperature in the cyclones was regulated in such a way that the final temperature of the gas in the third cyclone was still 120–130° C. The very fine particles (smaller than approximately 20 microns) were caught in a wet cyclone and recycled to the reaction vessel.

The catalyst prepared in this way was analysed, after it had been heated to a temperature of 950° C. The loss on heating was 1.5% by weight. The following composition was afterwards found:

11.6% by weight of $Al_2O_3$
88.4% by weight of $SiO_2$
and traces of Fe, Na, K and Ca It was found that in the liquid phase alkylation of benzene or cumene with propylene a rapid decline in the conversion occurred when employing the catalyst just described.

In accordance with the present invention, catalysts prepared as described are subjected, before use, to the following steam treatment.

The stream treatment according to the present invention may be carried out in an atmosphere consisting entirely of dry steam, or in an atmosphere consisting of an inert gas containing steam, e.g. air containing 1–10% by volume of water vapor, preferably at least 3%. The temperatures are between 400° and 900° C., preferably between 600° and 800° C., for a time from 1 to 24 hours. The shorter times and lower water vapor contents are employed with the higher treating temperatures. Thus, suitable conditions include treatment with dry steam at 400° to 750° C. or with an inert gas containing 1–10% by volume and preferably at least 3% steam at 500° to 800° C. Atmospheric pressure is suitably employed but higher or lower pressures may also be used. It is preferred to carry out the treatment in a so-called fluidized bed.

The treatment with water vapor under the conditions described results in a reduction of available surface of the catalyst, e.g. from 600 sq. m. per gram to about 190 sq. m. per gram, and is believed to result in a reduction in the degree of acidity of the catalyst. It is not known, however, by what mechanism these changes improve the catalyst life for the process of the present invention.

The alkylation process according to the present invention comprises contacting, in the presence of steam treated cracking catalyst, propylene and cumene, alone or in admixture with benzene, at a mol ratio of aromatic to olefin of at least 3:1, a temperature in the range between 160° and 300° C. and a liquid hourly space velocity (L.H.S.V.) of at least 4 v./v./hr., separating the reaction mixture from the catalyst and recovering as product a mixture of alkyl benzenes containing at least 25% diisopropyl benzenes whereof a major proportion is para-diisopropyl benzene. Such a process, in which an unimproved acidic siliceous cracking catalyst is employed to promote the reaction, is disclosed in copending patent application Serial No. 518,269, filed June 27, 1955 of De Keizer. In a preferred modification, the alkylation is carried out by charging the aromatic and the propylene at a molar ratio not higher than the highest permissible degree of alkylation, at a liquid hourly space velocity of at least 4 v./v./hr., into a uniform reaction mixture comprising the aromatic, alkylated reaction product, powdered cracking catalyst, and no more than 1 mol percent unconverted propylene, maintaining the resulting admixture at a temperature in the range between 160° and 300° C., separating some of the admixture from the catalyst and recovering as product a mixture of alkyl benzenes comprising at least 25% diisopropyl benzene. A special advantage is obtained in said alkylation process by employing as charge to the alkylation cumene which has been pretreated by contact with a cracking catalyst in the presence of at least 0.01 mol percent, but less than an equivalent amount, of an olefin under alkylating conditions. In order to obtain the full advantage of this last modification, at least 50% of the aromatic charged to the alkylation should be pretreated. A very substantial increase in permissible throughput rates, up to 50 to 100 v./v./hr. is obtainable by employing the pretreated cumene. A great advantage of said alkylation process is that it not only leads to a high diisopropyl benzene content in the reaction product, but that this fraction contains a major proportion of the para-isomer.

The aromatic hydrocarbon employed as charge stock in the alkylation is isopropyl benzene, i.e. cumene. Benzene may also be included in the charge to the process. These aromatics may be charged in pure form or in the form of admixtures or with other hydrocarbons which are not converted under conditions of the process. The aromatic hydrocarbons may be present in concentrations of 15 to 50% in liquid mixtures resulting from hydrocarbon conversion processes such as hydroforming, platforming, aromatization or the like, which are conventionally employed in petroleum refineries and are well known to the art. Benzene may be employed, for example, in the form of a close-cut platformate, which is a fraction containing no other aromatic hydrocarbon but containing a substantial proportion of non-aromatic hydrocarbons of the same boiling range.

Propylene is the only olefin employed in the alkylation step. It may be charged as a highly concentrated olefin stream or diluted with non-olefin, especially propane. In petroleum refineries the $C_3$ cut recovered from thermal or catalytic cracking processes may contain from 20 or 30 to 80% or more propylene, the rest being propane. Such cuts are suitable, but it is preferred to have at least 40 or 50% propylene present in the fraction employed.

Control and correlation of the reaction conditions in the alkylation step are essential to its successful operation. The alkylation is carried out with the hydrocarbon in the liquid phase. The pressure in the alkylation zone is therefore maintained sufficiently high to keep the mixture of reactants and product in the alkylation zone liquid at the temperature employed. Pressures in the range from 10 to 80 atmospheres, absolute, are suitable.

The reaction temperature affects, to a considerable extent, the course of the alkylation. Temperatures in the range between 160° and 300° C. may be employed. Particularly good results are obtained in the range between 180° and 240° C. and especially at about 200° C.

The throughput rate or liquid hourly space velocity (L.H.S.V.) is a particularly important variable in the alkylation. This quantity is a measure of the flow rate of the reactants; it is expressed as the number of parts by volume of liquid which passes through the reaction zone per part of catalyst per hour (v./v./hr.). In a given system, i.e. for a fixed reactor volume and fixed volume of catalyst, the L.H.S.V. varies inversely as the contact time; i.e., at a high L.H.S.V. the time of contact of the reactants with the catalyst is relatively short.

The optimum L.H.S.V. may vary within relatively wide limits according to the nature and activity of the catalyst, the molar ratio of aromatic to propylene, the alkylation temperature and the type of cumene feed stock employed. In the modification of the alkylation in which the cumene is not pretreated, L.H.S.V. values in the range between 4 and 10, and especially between 6 and 10, are preferred. Higher throughput rates, up to 20 v./v./hr., may be employed but under these conditions the yield of alkylated products decreases. Some of the propylenes may be polymerized under such conditions, rather than being reacted with the aromatics present.

In the mode of alkylation in which at least 50% of the cumene is pretreated as described above, liquid hourly space velocities in the range from 10 to 50 or higher may be employed, the range between 20 and 50 being preferred. In a particularly preferred modification, all the cumene charged to the alkylation zone is pretreated and the L.H.S.V. in this case is preferably above 40 but below 100 v./v./hr.

The ratio of aromatic to propylene in the charge to alkylation and specifically of cumene to propylene, also substantially affects the results of the alkylation. Best results are obtained at relatively high ratios of cumene to propylene; although mol ratios as low as 2:1 may be employed, it is preferable to have a ratio of at least 5:1. The higher the ratio of cumene to propylene in the alkylation zone, the greater will be the relative yield of the desired diisopropyl benzenes compared to the undesired triisopropyl- or other polyisopropyl benzenes. Ratios as low as 3:1 and as high as 12:1 may be employed, but for practical reasons values in the range between 5:1 and 8:1 are preferred.

The invention will be illustrated by means of the following example:

EXAMPLE

A number of alklations were carried out with the use of the improved process according to the invention, use also being made in certain cases of the cumene pretreatment as described above. In these cases the alkylation was accordingly carried out continuously in such a way that the liquid in the reaction zone had a homogeneous or substantially homogeneous composition, and the concentration of the olefin in the reaction zone was low, preferably lower than one mol percent, the catalyst being kept uniformly distributed over the reaction zone and the molar ratio of olefin to the organic compound to be alkylated being higher in the feed stream than in the reaction zone, but not higher than corresponded to the highest permissible degree of alkylation.

The results obtained are shown in Table I.

Table I.—Alkylation of cumene with propene (mol. ratio 5:1; reaction temperature 200° C.; L.H.S.V.=2; tube test without homogeneous mixing)

| State of catalyst | Propene conversion | | |
|---|---|---|---|
| | 0–3 hours | 3–6 hours | 6–9 hours |
| | Percent | Percent | Percent |
| Dried at 400° C | 90 | 84 | 78 |
| Treated for 24 hours with steam at 600° C. and atmospheric pressure | 99.5 | 99.5 | 99.5 |
| Treated for 24 hours at 800° C. and atmospheric pressure with air containing 3% by vol. of steam | 99.0 | 99.0 | 99.0 |

We claim as our invention:

1. An alkylation process for the preparation of monocyclic isopropyl-substituted aromatic hydrocarbons which comprises contacting in liquid phase at a temperature of from 160° to 300° C. and at a liquid hourly space velocity in the range from 4 to 100 v./v./hr. a mixture comprising isopropyl-substituted aromatics of the formula $$C_6H_{6-n}(C_3H_7)_n$$

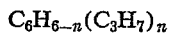

wherein $n$ is an integer from 1 to 4 (inclusive) and including propylene and a substantial proportion of cumene, the mole ratio of aromatic to olefin in said mixture being at least 3:1, with an acidic silica-alumina catalyst which has been subjected, after preparation, to heating in the presence of water vapor at a temperature between 400° and 900° C. and recovering as product polyisopropyl benzenes resulting from the propylation of said cumene.

2. A process according to claim 1 in which said heating is carried out in the presence of dry steam at a temperature between 400° and 750° C. for from 1 to 24 hours.

3. A process according to claim 1 in which said heating is carried out in the presence of an inert gas containing 1–10% by volume of water vapor, at a temperature between 500° and 800° C. for from 1 to 24 hours.

4. An alkylation process for the preparation of monocyclic isopropyl-substituted aromatic hydrocarbons which comprises contacting in liquid phase at a temperature of from 160° to 300° C. and at a liquid hourly space velocity in the range from 4 to 100 v./v./hr. a mixture comprising isopropyl-substituted aromatics of the formula $$C_6H_{6-n}(C_3H_7)_n$$

wherein $n$ is an integer from 1 to 4 (inclusive) and including propylene and a substantial proportion of cumene, the mole ratio of aromatic to olefin in said mixture being at least 3:1, with an acidic silica-alumina catalyst which has been subjected, after preparation, to heating in the presence of water vapor at a temperature between 600° and 800° C., and at a water vapor pressure not in excess of about atmospheric pressure and recovering as product polyisopropyl benzenes resulting from the propylation of said cumene.

References Cited in the file of this patent

UNITED STATES PATENTS

| | | |
|---|---|---|
| 2,698,305 | Plank et al. | Dec. 28, 1954 |
| 2,719,111 | Adams et al. | Sept. 27, 1955 |
| 2,730,557 | Max et al. | Jan. 10, 1956 |
| 2,744,150 | Enos | May 1, 1956 |
| 2,755,231 | Blanding et al. | July 17, 1956 |

FOREIGN PATENTS

| | | |
|---|---|---|
| 526,954 | Belgium | Sept. 4, 1954 |
| 526,955 | Belgium | Sept. 4, 1954 |